United States Patent [19]

Mattern

[11] 4,129,750
[45] Dec. 12, 1978

[54] DIGITAL TIME DIVISION MULTIPLEX TELECOMMUNICATION NETWORK

[75] Inventor: Alfred Mattern, Gröbenzell, Germany

[73] Assignee: Siemens Aktiengesellschaft, Munich, Germany

[21] Appl. No.: 784,452

[22] Filed: Apr. 4, 1977

[30] Foreign Application Priority Data
May 6, 1976 [DE] Fed. Rep. of Germany ....... 2620058

[51] Int. Cl.² .............................................. H04J 3/08
[52] U.S. Cl. .......................... 179/15 AL; 179/15 BF; 179/18 EA
[58] Field of Search ......... 179/15 AL, 15 BF, 18 EA

[56] References Cited
U.S. PATENT DOCUMENTS

| Re. 28,811 | 5/1976 | Pierce | 179/15 AL |
| 3,925,621 | 12/1975 | Collins | 179/15 AL |
| 4,002,843 | 1/1977 | Rackman | 179/15 AL |
| 4,002,847 | 1/1977 | Dail | 179/15 AL |
| 4,032,893 | 6/1977 | Moran | 179/15 AL |
| 4,048,446 | 9/1977 | Hafner | 179/15 AL |

Primary Examiner—David L. Stewart
Attorney, Agent, or Firm—Schuyler, Birch, Swindler, McKie & Beckett

[57] ABSTRACT

A digital time division multiplex (TDM) telecommunication network is described wherein the subscriber terminals are located on a common TDM highway and are served from a central office in accordance with the sequencing principle. The flow of information can be switched on branch routes using branching switching devices, a fixed sequence being adhered to in this case, as well.

3 Claims, 3 Drawing Figures

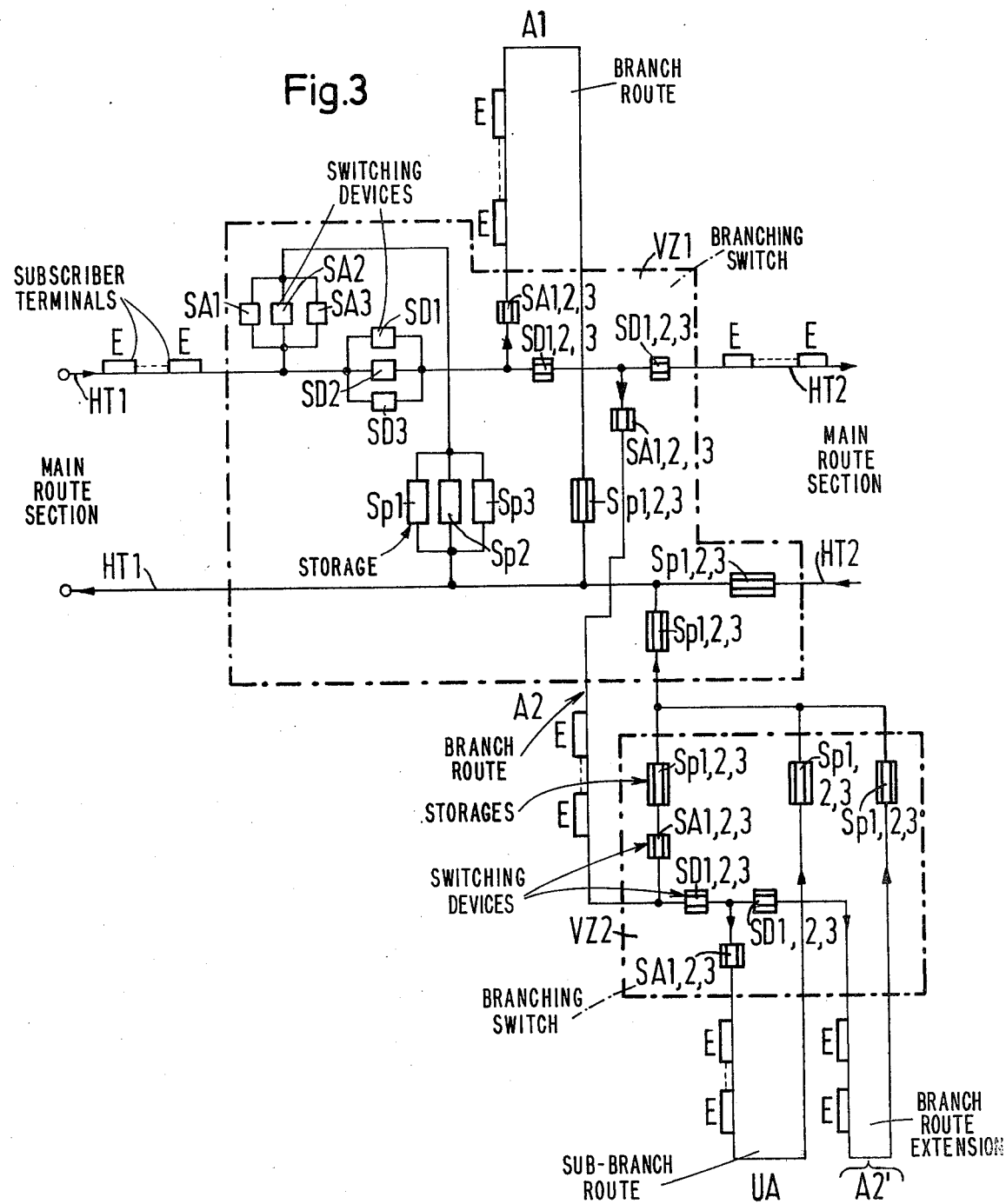

DIGITAL TIME DIVISION MULTIPLEX TELECOMMUNICATION NETWORK

BACKGROUND OF THE INVENTION

The invention relates to a digital time division multiplex (TDM) telecommunication network wherein the subscriber terminals are connected in a defined sequence to a common TDM highway and wherein through a central office, from which the TDM highway begins and to which it is returned, the telecommunication data in each pulse frame for subscriber terminals involved in calls are transmitted in the sequence of their connection to the TDM highway. Each data portion is accepted by the first subscriber terminal that has not yet been supplied with information, whereupon the latter immediately thereafter transmits to the central office in outgoing direction the information to be sent by it past subsequent subscriber terminals.

In a similar TDM telecommunication network of known construction (cf. West German patent application P 24 38 199.5-31) the TDM highway constitutes a single unbranched route. A copy of the West German patent application No. P 24 38 199.5-31 can be found in the application file. A translation of this West German patent application also can be found in the application file. This translation corresponds to U.S. Pat. No. 4,051,328 in which foreign priority was claimed based on West German Patent Application No. P 24 38 199.5-31. This U.S. Pat. No. 4,051,320 was issued on Sept. 27, 1977 to the same inventor and is assigned to the same assignee as the present invention. However, in developing such a system it was learned that even in the region of a central office there may be a need for a branched bus system, particularly, if there are remote groups of terminals. If, as assumed hereinabove, the TDM highway begins from the central office and terminates therein, i.e., if only one looped circuit is provided, the interruption of such a loop at any point means the breakdown of the entire group of terminals served by this loop.

Therefore, it is an object of the invention to provide for a telecommunication network of the type described hereinabove having a branching structure by means of which one can cope with the spatial distribution of the subscriber terminals and wherein complete breakdowns and breakdowns of large regions of such a network configuration are largely avoided.

SUMMARY OF THE INVENTION

In accordance with the principles of the invention the foregoing and other objects are achieved in a network of the type described hereinabove wherein the network is arranged in at least a main route section connected to a central office and a number of branch routes. The branch routes are interconnected and connected to the main route by branching switch means. One of the branching switch means can be operated to merely connect the ends of the main route so that the information being transmitted proceeds only thereover, or those of the branch routes connected to that switch means are connected to the main route. Other branching switch means may connect the branch routes which are connectable to said main route to other branch routes. The branching switch means are operated in a sequence so as to interconnect the main route or to connect the branch routes to the main route in a sequence corresponding to the sequence in which predetermined subscriber terminals are to receive transmitted information. Branches having no subscriber terminals involved in a call are excluded from the sequence.

Thus, in accordance with the invention a true branching system is provided without requiring the operation to deviate from the principles characterizing the loop system referred to hereinabove. Should there be a breakdown of a branch route, it will affect only a small part of the entire network, and possibly, a comparatively large portion of the network will remain intact even if a main route section breaks down, since further subbranches serving a considerable part of the overall network can operate through unaffected individual branches.

Through a further development of the invention, the branching principle in accordance with the invention is made to apply to an integrated TDM telecommunication network transmitting the telecommunication information of various service classes, e.g., data, telephone information, telecommunication information in connection with facsimile transmission or with video telephony.

In accordance with another development of the invention, the TDM telecommunication network is operated in such a way that optimum use is assured of the time of the TDM highway and, thus, a large number of subscriber terminals can be supplied and various classes of information can be provided.

BRIEF DESCRIPTION OF THE DRAWINGS

The principles of the invention will be more readily understood by reference to the following description of a preferred embodiment of a network constructed according to the principles of the invention in conjunction with the drawings which are briefly described as follows:

FIG. 3 is a schematic diagram providing details of branching switches of the telecommunication network of FIG. 2.

DETAILED DESCRIPTION OF THE PRIOR ART NETWORK

Figure 1:
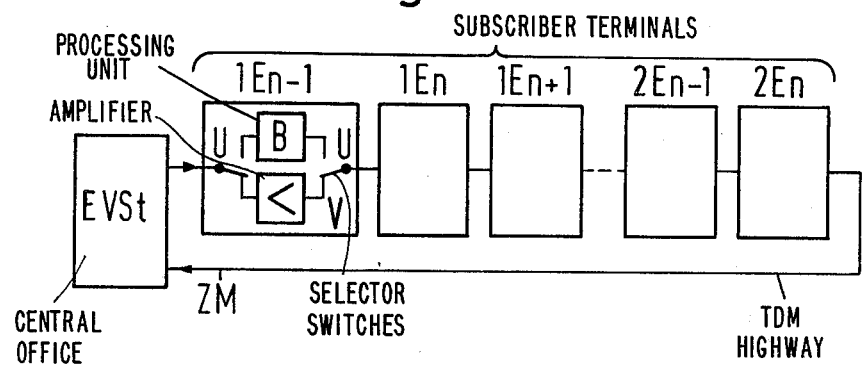
FIG. 1 is a schematic diagram of a prior art unbranched TDM telecommunication network having a sequencing multiple.

In the TDM telecommunication network of known construction shown in FIG. 1 there is provided a TDM highway ZM which begins from a central office and returns to form a closed loop. The telecommunication network which is generally described below with reference to FIG. 1 is the same telecommunication network described in detail in West German Patent Application No. P 24 38 199.5-31, a copy and translation of which can be found in the application file. The translation corresponds to U.S. Pat. No. 4,051,328. Subscriber terminals that are marked by indices in the sequence of their connection are connected to TDM highway ZM. Thus, a subscriber terminal is labeled $1En$ which, viewed in outgoing direction from the central office, is located behind subscriber terminal $1En-n$ but in front of subscriber terminal $1En+1$. The illustrated physical arrangement of subscriber terminals corresponds to the time sequence in which they receive information from the central office. The prefixed number 1 in the reference symbol indicates that these are Class 1 subscriber terminals, e.g., telephone subscriber terminals, whereas the subscriber terminals 2E$n$−1 and 2E$n$ (also shown) are data terminals.

In this case, the subscriber terminals in question are connected to TDM highway ZM in such a way that they either merely resupply the bit groups transferred to their inputs to the TDM highway, but otherwise leave them unaltered, in which case they merely work as repeaters, or pass on to their processing unit B information transferred to their input, in which case they are functioning as receivers. As will be detailed hereinbelow, the latter mode of operation can only result in connection with information that has been transmitted from the central office. The above conditions are illustrated with the aid of selector switches that are capable of switching between amplifier component V and processing unit B.

If, as an example, it is assumed that during the time the three terminals 1E$n$−1, 1E$n$ and 1E$n$+1 are involved in a call, at the start of each sampling pulse frame they are made ready by an appropriate unblocking bit group passing through all activated subscriber terminals with equal effect for accepting information transmitted from the central office. The informaintended for these subscriber terminals, viewing this class separately, is transmitted from the central office in the sequence in which the terminals are connected to the TDM highway ZM, if necessary in a mixture of information of other classes, each class separately transmitted in its own sequence. Thus, within each sampling pulse frame first the information for subscriber terminal 1E$n$−1, then the information for subscriber terminal 1E$n$ and, finally, the information for subscriber terminal 1E$n$+1 are transmitted.

Hence, on the section of TDM highway ZM outgoing from the central office, the information for subscriber terminal 1E$n$−1 sent first reaches this subscriber terminal as the first activated terminal. The latter accepts the telecommunication information and, in turn, transmits still in the same position; that is, before a subsequent bit group passes through it, an item of telecommunication information to TDM highway ZM toward the second subscriber terminal 1E$n$. The transmitted item of telecommunication information is merely amplified by this subsequent subscriber terminal 1E$n$ and by all further subscriber terminals and, thus, cannot be accepted by them as an item of telecommunication information coming from the central office. This results from a corresponding criterion accompanying the telecommunication information outgoing from subscriber terminals.

The telecommunication information transmitted from subscriber terminal 1E$n$−1 is finally transferred back to central office EVSt over the returning section of TDM highway ZM.

Upon acceptance of the telecommunication information coming from the central office and intended for subscriber terminal 1E$n$−1, the latter is blocked for the rest of the sampling pulse frame from accepting further items of telecommunication information transmitted from there.

The next item of telecommunication information of Class 1 transmitted from central office EVSt is thus transferred in unaltered form to second subscriber terminal 1E$n$, by which it is accepted. This subscriber terminal as described in connection with the preceding one, also transmits its item of telecommunication information which passes through all subsequent subscriber terminals and, finally, also returns to the local office. In like fashion, the remaining subscriber terminals also accept telecommunication information from the central office during the relevant time periods which correspond to the sequence of their connection to TDM highway ZM and relay telecommunication information thereto.

DETAILED DESCRIPTION OF THE PREFERRED EMBODIMENT

Figure 2:
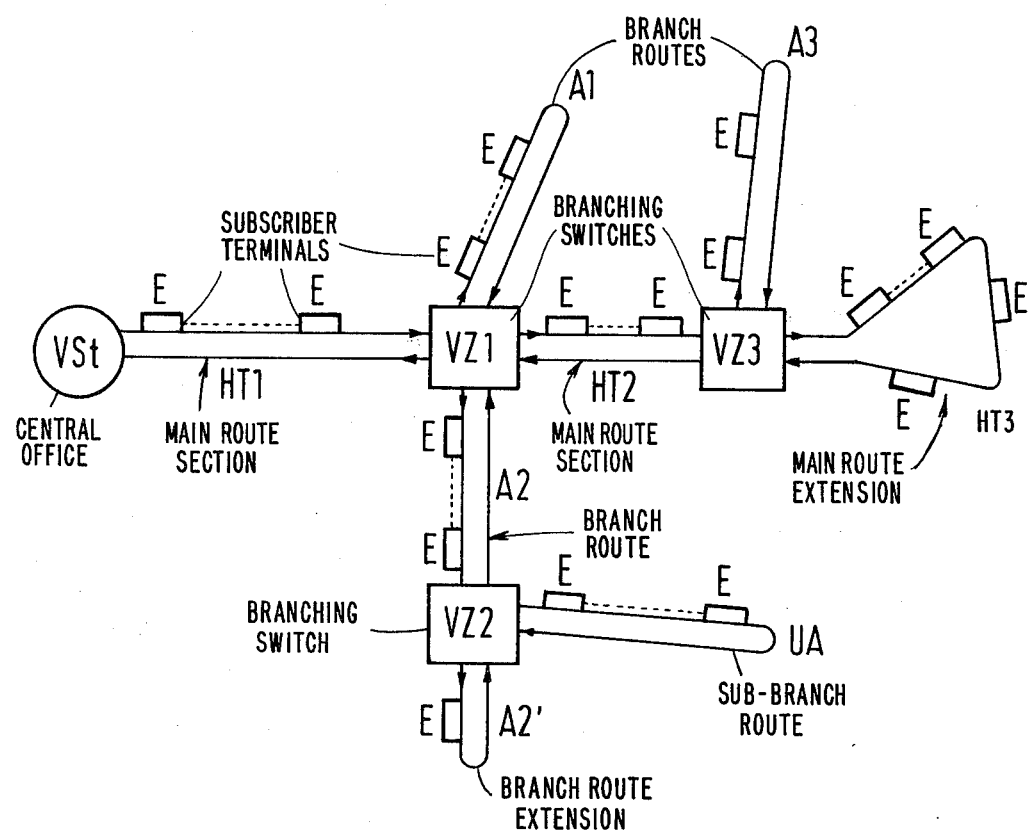
FIG. 2 is a schematic diagram of a TDM network having a branching structure in accordance with the invention.

FIG. 2 shows a TDM telecommunication network constructed in accordance with the invention and having a sequencing multiple which, however, consists not only of a single TDM highway loop but has a branch configuration.

The outgoing part of a first main route section HT1 of the TDM highway begins from a central office EVSt, and, the returning part of this route section terminates therein. The main route section HT1 establishes the connection between central office EVSt and a first branching switch VZ1. A first branch route A1 and a second branch route A2 extend from the branching switch. Also, the outgoing part of main route extension HT2 proceeds from there, and its returning part terminates therein. The main route extension HT2 establishes a connection between first branching switch VZ1 and a third branching switch VZ3. A branch route A3 branches off at this third branching switch. Also, main route extension HT3, whose returning part also terminates therein, continues from that branching switch.

The branch A2 mentioned above, outgoing from branching switch VZ1 is routed to another branching switch VZ2, from which extends a subbranch UA which terminates at the switch, and from which, moreover, the extension A2' of branch A2 extends and is terminated.

Subscriber terminals E are connected to each of the main route sections of the branches and branch route sections. The supply of such subscriber terminals with information transmitted from central office EVSt in sequence, as well as the acceptance of such information and the thusly initiated subsequent retransmission of information to be supplied in an outgoing direction, occurs on each of the line sections viewed separately in the manner described with reference to FIG. 1.

FIG. 3 shows in this connection the routing in the branching switch of the information flow coming from the central office and the information flow coming from subscriber terminals connected to branch routes or main route extensions. Thus, it can be seen that the outgoing part of main route section HT1 incoming at branching switch VZ1 can be switched by switching devices SA/SD to the returning part of main route section HT1, to the outgoing part of branch section A1, to the outgoing part of branch route A2 and to the outgoing part of main route extension HT2.

The connection between the outgoing part of incoming route section HT1 and the aforementioned outgoing line sections occurs sequentially, i.e., in the recited sequence taking into consideration the sequence of the information transmitted from the central office. Where given individual branch routes have no subscriber terminals involved in a call, those branches are, respectively, skipped in sequence.

Simultaneously with the opening of a switching device SA for the purpose of connecting the outgoing part of main route section HT1 to an outgoing part of a branch, the switching device SD assigned to the switching device SA in question and located in the outgoing part of the main route is disabled so that, as desired, during a given operating period information coming from the central office can be transferred only to subscriber terminals located in a branch route.

The pair of switching devices SA/SD are in the known manner constructed to be activated in like fashion as the selector switches provided in the individual subscriber terminals, as was described with reference to FIG. 1, responsive to the reception of a header code word which is characteristic of subscriber groups of a given class of information.

Unlike the conditions for the deactivation of subscriber terminals responsive to a signal generated by the terminals themselves, the corresponding inverse activation of these pairs of switching devices, after all subscriber terminals involved in calls and located in the relevant branch have been supplied with information, occurs responsive to the reception of a disabling code word sent from the central office. This disabling code word appears at the end of the block of information groups designated for the branch. If a branch route is to be skipped, two disabling code words follow sequentially.

As illustrated in FIG. 3 with reference to the branching switch VZ1 shown as an example, three switching devices SA1-SA3 and SD1-SD3 are connected in parallel. Each of these switching devices is designated in accordance with a class of information peculiar to it in the same manner as the subscriber terminals and can be activated independently of the switching devices connected in parallel. That means if, for example, switching device SA1, after branch A1 has been supplied with first class information, has been disabled again and the associated switching device SD has been made condutive, first or third class information nevertheless can be transferred to subscriber terminals located in branch A1 by way of switching device SA2 or SA3. Of course, in this case switching device SD2 or SD3 is disabled. The returning line routes branched in branching switch VZ1 are each connected by a separate return storage to the returning section of the incoming main route HT1. The same is true of the following part of the outgoing main route HT2.

Storages Sp are each provided separately for a class of information, so that if, as assumed, three different classes of information are provided for each returning part of the branched routes, three storages Sp1-Sp3 are connected in parallel. This prevents a flowing together of the information groups which would interfere with the identification of the information.

Similar conditions prevail in branching switch VZ2 also shown in FIG. 3 in which subbranch route UA extends from branch route A2 and from which branch route A2 continues as branch route A2'. However, there is the difference that the returning parts of subbranch route UA and of branch route extension A2' are not connected directly to the returning part of the main route but with the returning part of branch route A2 which, in turn, is connected via its return storage to the returning section of main route HT1/2.

The following is a description of the operation of the TDM telecommunication network described hereinabove and constructed in accordance with the principles of the invention.

It is assumed that on the outgoing part of the first main route section HT1 information is first supplied from the central office to subscriber terminals E directly connected to that line section. The information is accepted by subscriber terminals E in the manner described with reference to FIG. 1, and these subscriber terminals retransmit toward the branching switch VZ1 the information to be supplied thereby.

Each of the items of information outgoing from the central office is prefixed by a header code word which indicates the class of information and causes subscriber terminals to be ready for accepting only a given class of information. This header code word also remains prefixed to the information supplied from the subscriber terminals, but it can be shortened by one or more bits. When the first of these header code words marking an item of information of the first class is transferred in branching switch VZ1 to the pair of switching devices SA1/SD1 that is first in the connecting sequence, it causes operation of switching device SA1 and switching device SD1 is rendered nonconductive, so that the informaton retransmitted from the central offices can be transferred to the returning part of the main route by way of storage Sp1. This storage is likewise made accessible for the subsequent item of information by the aforesaid header code word.

Immediately following the information groups provided for the subscriber terminals E connected to main route section HT1, a final code word is sent from the central office for operating the pair of switching devices SA1/SD1 associated with the main route section HT1 in such a way that switching device SA1 is disabled and switching device SD1 is made conductive.

The header code word of the unit of information which is the first of the information groups provided for branching route A1 and subsequently sent from the central office causes switching device SA1 associated with branch route A1 to be operated and the associated switching device SD1 to be rendered nonconductive, again assuming that the information is first class information. Thus, the information of this information group is transferred to subscriber terminals E which are connected to the branch route A1. Information retransmitted from these subscriber terminals is routed from them via the returning part of this branch route A1 to the associated storage Sp1 in the return portion thereof and is transferred from there to the returning part of the main route. This will be further explained hereinbelow.

Thereafter the reception of a related final code word results in the blocking of switching device SA1 associated with branching route A1 and the closing of the associated switching device SD1 so that it is conductive.

The header code word of the unit of information of the subsequently transmitted group of information causes the switching device SA1 leading to the second branch route A2 to be operated and the disablement of the associated switching device SD1 leading to main route extension HT2. The subscriber terminals connected to the second branch route A2 are then supplied with information.

The final code word sent after this information group must now work in such a manner that it does not affect the switching devices that lead to branching route A2 so as to prevent the retransmission to main route extension HT2, but instead disables switching device SA1 that routes the continuing section of branch route A2 via the return storages to the returning section of the main route, thereby rendering conductive the associated switching device SD1. To achieve this, the circuitry of switching devices SA1, SA2 and SA3 leading to branch route A2 and to associated transit switching devices SD1, SD2, SD3, which are connected to main route section HT2, is so designed that it does not respond until the third final code word is received with the result that the access to branch route A2 is blocked and the passage to main route section HT2 opened.

Previously, the subscriber terminals connected to subbranch route UA and to extension A2' of branch route A2 were supplied with information in the manner described hereinabove.

The processes described hereinabove are now repeated in like fashion in conjunction with subscriber terminals that are connected to main route section HT2, branch route A3 and, finally, main route section HT3.

As described hereinabove, the units of information supplied from subscriber terminals are transferred to the associated return storages. As mentioned earlier, these return storages are necessary to prevent overlapping between time frames on the common returning section of the main route or of a branch route that is branched off again. The retransmission of information from these storages to the returning section of the main route and of a branch route normally occurs in a sequence of priorities which is determined in accordance with the bit signaling rate of the individual classes of information in view. Thus, storages containing data of a class information having a higher bit signaling rate are read out on a priority basis. Within this priority sequence one proceeds in accordance with the above described sequence of selecting the main route sections and branch routes. Within the context of the storages of the branching switch VZ1 this means that first the storages through which the return runs from main route section HT1 are read out, then the storages associated with branch routes A1 and A2 and, finally, the storages located in the return path of main route section HT2. The storages of branching switch VZ2 follow an analogous independent program.

If however, a return storage is accessed in the sequence and does not hold any information, then the information output of a return storage next in the sequence in accordance with the program is initiated. In this case, the entire information content in the storage at the moment is read out.

If, in the meantime, the priority return storage that has been omitted in the sequence has received information, the information output from the omitted priority information storage is retrieved after the information output of the just activated lower priority return storage is terminated. The control of these processes is performed by a conventional storage control not shown in FIG. 2, which assures that on the returning parts of the main route sections and on the branch route there is a minimum of unused time intervals.

Since, as mentioned earlier, the sequence normally adhered to for the readout of the return storages is interrupted in favor of omitted priority storages, and this interruption may be repeated several times in favor of one and the same priority storage within a pulse frame, the sequence of the information groups returning to the central office is no longer the same as the sequence of the corresponding information groups transmitted by it. Hence, an origin address is prefixed to each block and subblock of information groups retransmitted via the return storages, on the basis of which in the central office the affiliation of the information groups can be determined, because in the blocks and subblocks the sequence of the information groups has remained intact.

If one branch route is interfered with, then in the same manner as described for the case where at the moment none of the subscriber terminals of the branch route is involved in a call, the disturbed branch route can be omitted by sending a disabling code word directly following the disabling code word that terminates the information block for the branch route and the main route to be selected first, so that only subscriber terminals connected thereto are affected by the interference.

The principles of the invention are described herein by describing a preferred form of network configuration and its operating principles. The described system can obviously be modified or changed, as can the specifically described operating steps, while remaining within the scope of the invention as defined by the appended claims.

I claim:

1. In a digital time division multiplex (TDM) telecommunication network having a plurality of subscriber terminals connected in a predetermined sequence to a common TDM highway, said TDM highway beginning and ending in a central office thereby forming a loop, each TDM time frame containing information for each said subscriber terminal, said information being arranged in said time frame in a time sequence corresponding to the sequence of connection of said subscriber terminals to said TDM highway, the improvement comprising:

said TDM highway being arranged in at least one main route section and a plurality of branch routes, said main route section and said branch routes carrying information to and from said central office;

a plurality of branching switch means actuated by said central office for sequentially coupling said branch routes to said main route section and thereby to said central office, said main route section and said branch routes having incoming and outgoing portions relative to said branching switch means;

at least one said branching switch means including first switches for sequentially connecting the incoming portion of said main route section to the outgoing portion of said main route section and second switches for sequentially connecting the outgoing and incoming portions of at least one of said branch routes, respectively, to the incoming and outgoing portions of said main route section;

at least another one of said branching switch means connected to said main route section by one of said branch routes, said another one of said branching switch means including first switches for sequentially connecting the incoming portion of said one branch route to the outgoing portion of said one branch route and second switches for sequentially connecting the outgoing and incoming portions of at least another one of said branch routes, respectively, to the incoming and outgoing portions of said one branch route; and storage means connected in the incoming portions of each of said branch routes for temporarily storing information returning to said central office to thereby prevent overlapping between time frames.

2. The telecommunication network defined in claim 1 wherein said first and second switches in each of said branching switch means and said storage means provide for separate connecting paths for each class of information being transmitted on said TDM highway.

3. The telecommunication network defined in claim 1 wherein said storage means are constructed and arranged to supply the transmitted information in a time frame in accordance with a priority sequence which is determined by the bit signalling rate of the individual classes of information being transmitted, those of said storage means having no information being excluded from the sequence and the next one of said storage means in the priority sequence subsequently being read out unless the excluded storage means receives information in the interim.

* * * * *